(12) United States Patent
Martinez et al.

(10) Patent No.: US 10,295,968 B2
(45) Date of Patent: May 21, 2019

(54) NETWORK DRIVEN ACTUATOR MAPPING AGENT AND BUS AND METHOD OF USE

(71) Applicant: INTERNATIONAL BUSINESS MACHINES CORPORATION, Armonk, NY (US)

(72) Inventors: Anthony E. Martinez, Orcas, WA (US); Bradley S. Tagg, Chester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 772 days.

(21) Appl. No.: 14/811,949

(22) Filed: Jul. 29, 2015

(65) Prior Publication Data

US 2015/0331403 A1  Nov. 19, 2015

Related U.S. Application Data

(63) Continuation of application No. 13/970,696, filed on Aug. 20, 2013, now Pat. No. 9,141,907, which is a continuation of application No. 13/458,027, filed on Apr. 27, 2012, now Pat. No. 8,560,611, which is a continuation of application No. 12/331,639, filed on Dec. 10, 2008, now Pat. No. 8,250,143.

(51) Int. Cl.
| | |
|---|---|
| G06F 15/173 | (2006.01) |
| G05B 15/02 | (2006.01) |
| H04L 29/08 | (2006.01) |
| G06F 9/54 | (2006.01) |
| G06N 5/00 | (2006.01) |

(52) U.S. Cl.
CPC .............. *G05B 15/02* (2013.01); *G06F 9/542* (2013.01); *G06N 5/00* (2013.01); *H04L 67/12* (2013.01)

(58) Field of Classification Search
CPC ....................................................... H04L 67/12
USPC ............................................................ 709/224
See application file for complete search history.

(56) References Cited

U.S. PATENT DOCUMENTS

| | | |
|---|---|---|
| 5,495,576 A | 2/1996 | Ritchey |
| 6,773,344 B1 | 8/2004 | Gabai et al. |
| 7,343,222 B2 | 3/2008 | Solomon |
| 7,864,168 B2 | 1/2011 | French |
| 9,675,878 B2 * | 6/2017 | Barney ............... A63F 13/245 |
| 2002/0178593 A1 | 12/2002 | Kuru |
| 2003/0038776 A1 | 2/2003 | Rosenberg et al. |

(Continued)

OTHER PUBLICATIONS

Olsson et al., "From unknown sensors and actuators to visually guided movement", 2005 4th IEEE International Conference on Development and Learning, Osaka, Japan, Jul. 19-21, 2005, 1 page.

(Continued)

*Primary Examiner* — Karen C Tang
(74) *Attorney, Agent, or Firm* — William H Hartwell; Andrew M. Calderon; Roberts Mlotkowski Safran Cole & Calderon, P.C.

(57) ABSTRACT

A network driven actuator mapping agent is provided. A system includes a sensor configured to sense an event in a first environment. The system also includes an actuator configured to perform an action in a second environment. Moreover, the system further includes a mapping manager configured to map the sensed event to the actuator to provide a custom interaction in the second environment.

18 Claims, 4 Drawing Sheets

(56) References Cited

U.S. PATENT DOCUMENTS

| | | | |
|---|---|---|---|
| 2004/0227727 A1 | 11/2004 | Schena et al. | |
| 2005/0090933 A1* | 4/2005 | Ebert | B25J 9/1694 |
| | | | 700/245 |
| 2006/0142986 A1* | 6/2006 | Czora | G06N 3/004 |
| | | | 703/11 |
| 2006/0149489 A1 | 7/2006 | Joublin et al. | |
| 2006/0262188 A1* | 11/2006 | Elyada | G06T 7/97 |
| | | | 348/143 |
| 2007/0027405 A1 | 2/2007 | Merfeld et al. | |
| 2007/0196809 A1 | 8/2007 | Sen | |
| 2007/0222865 A1* | 9/2007 | Levien | H04N 5/765 |
| | | | 348/222.1 |
| 2009/0088884 A1* | 4/2009 | Yuan | G05B 19/41885 |
| | | | 700/110 |
| 2009/0088885 A1 | 4/2009 | Yuan et al. | |
| 2009/0089700 A1 | 4/2009 | Gu et al. | |
| 2009/0148034 A1 | 6/2009 | Higaki et al. | |
| 2009/0164919 A1* | 6/2009 | Bates | G06Q 10/10 |
| | | | 715/757 |
| 2009/0174702 A1* | 7/2009 | Garbow | A63F 13/12 |
| | | | 345/419 |
| 2009/0177979 A1* | 7/2009 | Garbow | G06F 21/316 |
| | | | 715/757 |
| 2009/0228145 A1* | 9/2009 | Hodgson | A61B 17/1757 |
| | | | 700/258 |
| 2009/0235350 A1* | 9/2009 | Garbow | H04L 63/1441 |
| | | | 726/15 |
| 2010/0037152 A1* | 2/2010 | Bates | G06F 3/04815 |
| | | | 715/757 |
| 2010/0045660 A1* | 2/2010 | Dettinger | G06Q 90/00 |
| | | | 345/419 |
| 2010/0050100 A1* | 2/2010 | Dettinger | G06F 3/011 |
| | | | 715/764 |
| 2010/0057715 A1* | 3/2010 | Bates | G06F 21/31 |
| | | | 707/E17.014 |
| 2010/0073363 A1* | 3/2010 | Densham | G05B 17/02 |
| | | | 345/419 |
| 2010/0113153 A1* | 5/2010 | Yen | A63F 13/06 |
| | | | 463/37 |
| 2010/0324769 A1 | 12/2010 | Takaoka | |
| 2012/0004031 A1* | 1/2012 | Barney | A63F 13/06 |
| | | | 463/31 |
| 2013/0187930 A1* | 7/2013 | Millman | G06T 13/20 |
| | | | 345/473 |
| 2018/0018014 A1* | 1/2018 | Lutnick | G07F 17/3209 |

OTHER PUBLICATIONS

Johnson, T., "Artificial Intelligence", URL: htlp://www.osu-tulsa.okstate.edu/jpt/CS4793-Web/_notes/intro.ppt, May 30, 2008, 82 pages.

* cited by examiner

NETWORK DRIVEN ACTUATOR MAPPING AGENT AND BUS AND METHOD OF USE

FIELD OF THE INVENTION

The invention generally relates to a system and method for a mapping agent and, in particular, to a network driven actuator mapping agent and bus and method of use.

BACKGROUND

Artificial intelligence is an area of study that attempts to create intelligent agents, which perceive an environment and take actions in accordance with their perceptions. A primary objective of artificial intelligence is to make these agents reason and behave like humans in order to achieve the best possible outcome. To accomplish this objective, agents are created that are capable of natural language processing, knowledge representation, automated reasoning, and machine learning.

Specifically, artificially intelligent agents can be anything that can be viewed as perceiving its environment through sensors and acting upon the perceived environment through actuators. The input to the agent may be perceptual at any given instant or a complete history of everything the agent has perceived.

Agents can be rational by perceiving an environment and going though a sequence of states to obtain a desired outcome based on the perceived environment. These states may be updated so as to obtain the desired outcome even as the environment changes. For example, an environment may be a chess board. An artificially intelligent agent may perceive where the chess pieces are on the board and perform a number of calculations to determine what action should be taken to ultimately check mate the opponent. Based on these calculations, the agent may perform an action, e.g., using an actuator. In response, the opponent may perform an action. The agent can sense the changed environment that is brought on by the opponent's action and calculate the next move based on changed environment.

SUMMARY

In a first aspect of the invention, a system comprises at least one sensor configured to sense an event in a first environment and an actuator configured to perform an action in a second environment. The system also comprises a mapping manager configured to map the sensed event to the actuator to provide a custom interaction throughout a plurality of second environments.

In another aspect of the invention, a computer implemented method for a mapping agent comprises sensing at least one event in a first environment and mapping the at least one sensed event to an actuator configured to perform an action in one or more second environments, wherein the mapping is independent from the one or more second environments.

In yet another aspect of the invention, a computer program product comprising a computer usable medium having readable program code embodied in the medium is provided. The computer program product includes at least one component operable to: receive one or more events that are sensed in a first environment; receive information from at least one of a cardinality manager, a constraints manager, a proximity manager, and a synchronization manager; and determine an actuator to perform at least one action based on the received one or more events and the received information, wherein the at least one action is performed in one or more second environments.

In a further aspect of the invention, a method for a mapping agent, comprises providing a computer infrastructure being operable to: sense one or more events in a first environment and perform a mapping using the one or more sensed events and information received from one or more of a cardinality manager, a constraints manager, a proximity manager, and a synchronization manager, wherein the mapping is configured to map the one or more sensed events to an actuator.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
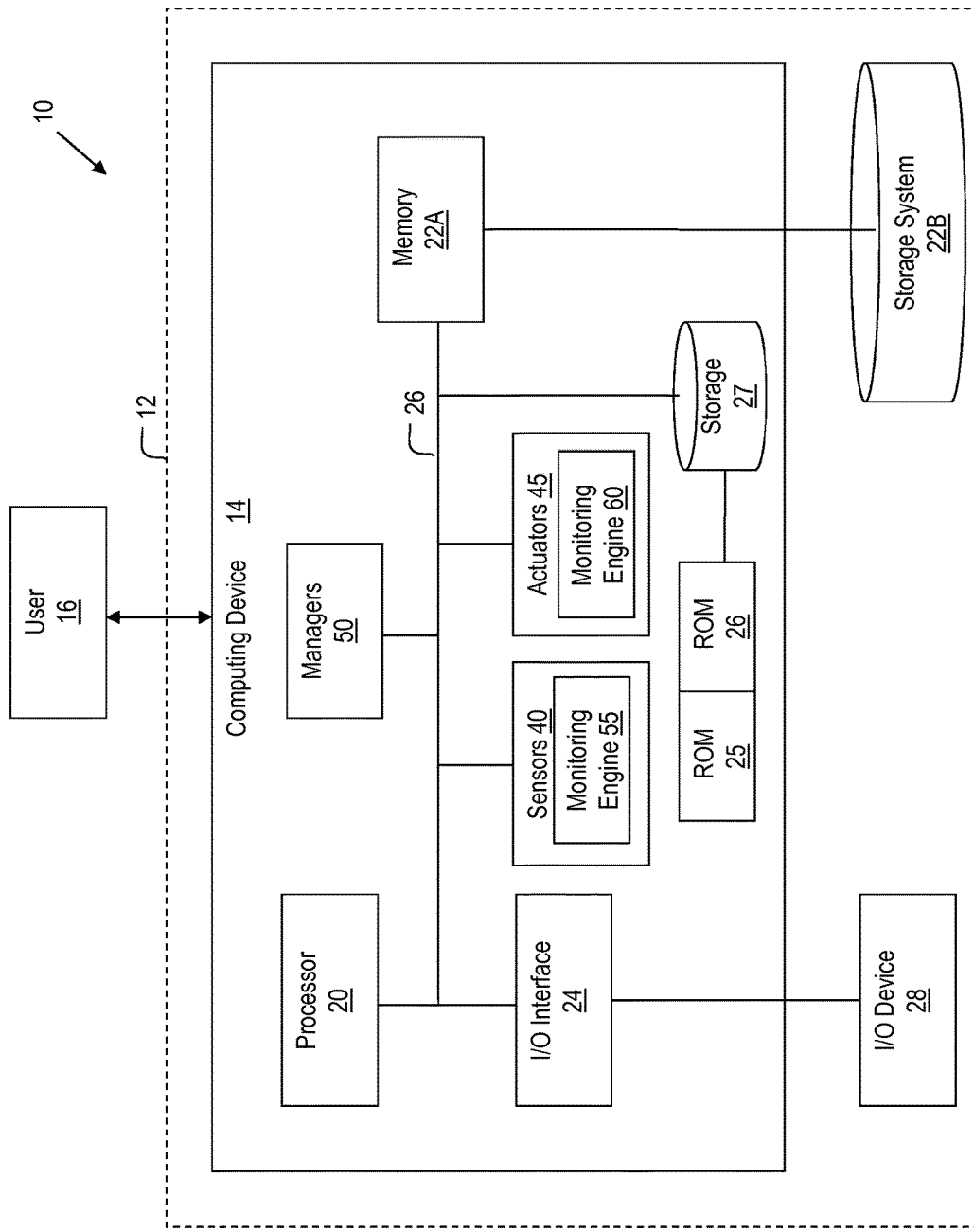
FIG. 1 shows an illustrative environment for implementing the steps in accordance with the invention.

The invention is directed to a system and method for a mapping agent and, in particular, to a network driven actuator mapping agent and bus and method of use. The invention provides the ability to execute actions in a first environment and have those actions reflected in modifiable ways in a second environment. The first and second environments may be real world environments and/or simulated environments. In embodiments the actions may be multi-behavioral.

More specifically, the present invention includes one or more sensors configured to sense real world environments and/or simulated environments and trigger actions from actuators, which are configured to perform actions based on a sensed environment. The determination of what actuator should be used to perform an action may be made using one or more managers, including a mapping manager. The mapping manager may be used to combine sensors and actuators via mappings to provide custom interactions based on the sensed environment and/or other inputs. In embodiments, hierarchies of sensors and/or actuators may be supported to allow combinations of sensors and actuators to behave in a coordinated manner.

For example, one or more sensors may be used to sense voice commands, gestures, and/or other events. These sensed events may be mapped onto an actuator, which performs actions based on the sensed events. In embodiments, these actions may be influenced by proximities and/or constraints of an environment as well as what actions are available to the actuator. By mapping sensed events onto an actuator, the present invention beneficially allows for customized interactions without expensive development costs.

A mapping manager, which maps an event onto an actuator, may sit on a network between a stimulator and an actuator and be used to bind and map stimulator actions to actuator results. In embodiments, the stimulator actions may be tied to and/or provided by actuator scripts. By using a single mapping manager as described herein, the present invention may preclude the need to develop custom mappings and allow actuators to be connected to stimulators without custom developments. Moreover, by using a single mapping manager, which may comprise one or more properties, the present invention beneficially allows actuators to be bound to many different stimulators and also allows actuator behavior to be scripted directly by end users, thereby allowing end users to create their own actuator results based on provided stimulations.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

a portable computer diskette,
a hard disk,
a random access memory (RAM),
a read-only memory (ROM),
an erasable programmable read-only memory (EPROM or Flash memory),
a portable compact disc read-only memory (CDROM),
an optical storage device,
a transmission media such as those supporting the Internet or an intranet, and/or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises one or more sensors 40, one or more actuators 45, and one or more managers 50.

The one or more sensors 40 are configured to sense events in a real world environment and/or in a simulated environment. In embodiments, the sensors 40 may include a monitoring engine 55 configured to aid the sensors 40 in recognizing one or more activities or events in the real world environment and/or in a simulated environment. Exemplary activities or events may include voice commands, gestures, etc., that can be used to measure a physical or observable quantity and convert the measured quantity into a signal which can be understood by the computing device 14.

The one or more actuators 45 are configured to perform an action in a real world environment and/or a simulated environment based on the one or more sensed events. In particular, the actuators 45 may include any number of components that are configured to communicate with and/or act upon anything in a real world environment and/or a simulated environment. Exemplary communications may occur visually, audibly, and/or via actions taken by the actuator 45 or an agent comprising the actuator 45. In embodiments, the actuators 45 may include a monitoring engine 60 configured to track actions performed by the actuator 45 and provide feedback to, e.g., a mapping manger.

The one or more managers 50 may include a mapping manager, which is configured to map events that are sensed by the one or more sensors 40 onto an actuator 45. The mapping process may be performed using one or more actuator scripts, which may be predefined and/or defined by a user 16. In embodiments, additional managers 50 may also be used by the sensors 40, actuators 45, and/or in conjunction with the mapping manager. Exemplary managers 50 may include a cardinality manager, a constraints manager, a proximity manager, a synchronization manager, a scripts manager, etc. These managers 50 are described in more detail below. The sensors 40, actuators 45, and managers 50 may be compiled by the program code.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution.

The computing device 14 is in further communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, microphones, headsets, etc.

In general, the processor 20 executes computer program code, which is stored in the memory 22A, a read-only memory (ROM) 25, random access memory (RAM) 26, storage 27, and/or storage system 22B. The computer code may be representative of the functionality of the sensors 40, actuators 45, and/or managers 50. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the processes described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Exemplary System

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Figure 2:
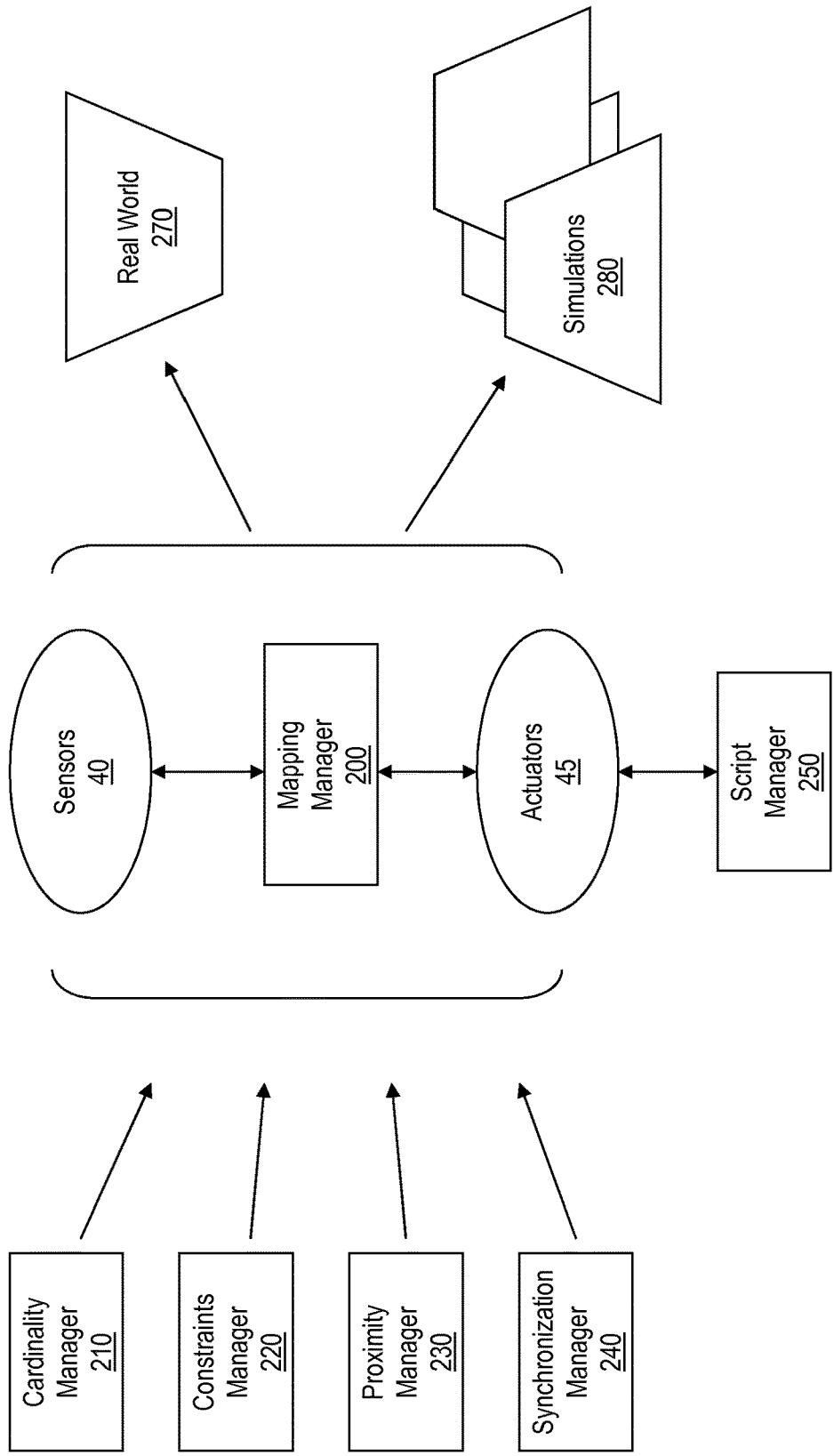
FIG. 2 shows an exemplary system in accordance with aspects of the invention.

FIG. 2 shows an exemplary system according to embodiments of the invention. In particular, FIG. 2 includes one or more sensors 40, one or more actuators 45, and a mapping manager 200 configured to map events that are sensed by the one or more sensors 40 onto an actuator 45. FIG. 2 also includes a number of additional managers that may be used by the sensors 40, the actuators 45, and/or in conjunction with the mapping manager 200. The managers may include, e.g., a cardinality manager 210, a constraints manager 220, a proximity manager 230, a synchronization manager 240, and a script manager 250. FIG. 2 also illustrates a real world environment 270 and one or more simulated environments 280. The simulated environments 280 may include virtual universes, virtual reality simulations, etc.

The sensors 40 illustrated in FIG. 2 are configured to sense one or more actions in a real world environment and/or in a simulated environment. Sensors 40 may be stand alone, associated with one or more objects, and/or an object in and of itself. A variety of types of sensors 40 may be used in the present invention to measure optical, thermal, mechanical, etc., changes. For example, one or more of the following sensors may be used in embodiments of the present invention: light sensors, infra-red sensors, proximity sensors, fiber optic sensors, light emitting diodes, scanning lasers, pressure sensors, RADAR, humidity sensors, sound sensors, motion sensors, orientation sensors, distance sensors, etc. In embodiments, a monitoring engine may be used to monitor activity and feed the activity to the sensor.

In embodiments, the cardinality manager 210, the constraints manager 220, the proximity manager 230, the synchronization manager 240, and/or the script manager 250 may be used by the sensors as well as by the mapping manager 200 and the actuators 45. The cardinality manager 210 may be used to determine what and/or how many sensors are associated with an object, how many objects are in an area, etc. The number of sensors associated with an object may be a one-to-one, many-to-many, one-to-many, many-to-one, etc., relationship. In embodiments, the information obtained by the cardinality manager 210 may be stored as metadata. By using the cardinality manager 210, it is possible to define the possible set of objects that may be affected by a sensed action and/or event.

The constraints manager 220 may be used to determine one or more constraints that may exist based on real world or simulated environmental conditions and store the obtained information as metadata. For example, the constraints manager 220 may identify the type of environment in which an action is being performed. The type of environment may be a real world environment 270 and/or any number of simulated environments 280. In embodiments, the constraints manager 220 may track one or more conditions within the environment such as, e.g., gravity, physical limitations, time limitations, gestures, etc. This information can be used to determine whether an action performed in a first environment can be mapped onto an action in a second environment, which may have different environmental constraints. Understandably, changes in constraints between environments may alter what is sensed and/or the behavior of an object.

For example, a person or a representation of a person in a first simulated environment may be able to fly. However, that same person may not be able to fly in a second simulated or a real world environment 270 due to forces of gravity. The constraints manager 220 may keep track of conditions, such as gravity, which would influence the ability of the person to fly in the second environment. In embodiments, this information can be sent to a mapping manager 200, which can make sure that the person's flying action does not get mapped into an environment where the person is not capable of flying. This may be performed, e.g., by voiding those actions that are impossible in an alternative environment and/or by providing a modified or alternative action to take instead of the impossible action.

The proximity manager 230 is configured to detect what objects are proximate to the sensed object. This may include a determination of what objects are physically near the sensed object, the type of objects that are proximate to the sensed object, and/or the context of the object. In embodiments, the physicality, type, and/or context of proximate objects may be used, e.g., by the mapping manager 200 to determine whether one or more mappings should be applied to objects proximate to the sensed object in addition to the sensed object itself.

The proximity manager 230 may determine the physicality of an object using the physical location or nearness of the object or sensor to the sensed object. Nearness may be measured differently between simulations and embodiments. For example, in embodiments, nearness may be any distance calculated to be affected by a sensed action or event.

The proximity manager 230 may determine the type of objects that are proximate to the sensed object. In embodiments, the same type of objects may behave certain ways when they are near objects of the same type. For example, similar objects near one another may act the same, different, or even opposite one another.

The proximity manager 230 may also determine the context of an environment, where sensors are at in the environment, etc. In embodiments, the context may be used when defining one or more relationships between objects. The physicality, type, and/or context of the proximity manager 230 may be used, e.g., by the mapping manager 200 to avoid requiring that the relationships be hard coded.

The synchronization manager 240 may be used to synchronously or asynchronously drive an action. For example, the synchronization manager 240 may receive one or more actions that need to be performed and determine the timing required to perform the one or more actions. In embodiments, the synchronization manager 240 may also determine the order in which one or more of the actions should be performed. The order may be performed using, e.g., a queuing structure.

The synchronization manager 240 may also monitor actions and/or feedback from actions. This may be performed, e.g., using the sensors 40, mapping manager 200, actuators 45, etc. In embodiments, this information may be used to determine whether the actions are occurring as scripted.

The information from the cardinality manager 210, the constraints manager 220, the proximity manager 230, and/or the synchronization manager 240 may be used to determine what mapping should be used on an action or event that is sensed by the one or more sensors 40. Moreover, actions and or events that are sensed by one or more sensors may be sent to the mapping manager 200.

More specifically, the mapping manager 200 includes logic (program code) that is configured to receive actions from the one or more sensors 45 and take inputs from the managers 210, 220, 230, and 240. This information is used to determine which actuator should be used to perform an action. The knowledge of what actuator should be chosen may be based on actuator 45 properties, constraints, and/or proximities that may be provided to the mapping manager 200 by one or more actuators 45. Once an actuator 45 is chosen, the mapping manager 200 may bind the actuator 45 properties in real time. In embodiments, one or more of the properties may also be cached so as to reduce the number of times the properties need be accessed, thereby increasing network performance. Moreover, the stimulators may invoke the actuators using one or more self defined protocols from the actuator.

Any number of mappings may be used to determine which actuator 45 to use. In embodiments, one or more of these mappings may be stored as persistent data in a database (storage system 22A) that is associated with the mapping manager 200. Exemplary mappings may include lossy, lossless, or abstraction mappings. One or more lossy mappings may be used to determine what actuator 45 should perform an action. Lossy mappings analyze the information received from the sensors 45 and the inputs from the managers 210, 220, 230, and 240 and discard or ignore information that does not have a noticeable affect on determining an actuator 45. By ignoring pieces of information, lossy mappings allow the received information to be reduced and/or condensed to create a more efficient result.

For example, if a stick hits a plurality of leaves on a tree, lossy mappings may use the movement of a subset of the leaves to represent the movement of all of the leaves and disregard the rest of the movements. Similarly, if a person in a simulated environment teleports to a far off planet, which cannot be mapped into a real world environment due to physical constraints, lossy mapping may ignore the teleportation information due to actuator constraints.

While embodiments contemplate the use of lossy mappings, lossless mappings may also be used to determine what actuator 45 should perform an action. Lossless mappings maintain the information in whole and do not discard or ignore pieces of information received from sensors 40 or managers 210, 220, 230, and 240.

Abstraction mappings may also be used to determine what actuator 45 should perform an action. Abstraction mappings generalize information received from sensors 40 and/or managers 210, 220, 230, and 240 by reducing the content of the received information into a concept or an observable phenomenon. For example, when an actuator 45 is unable to perform all of the tasks needed, abstraction mappings may be used to abstract what the actuator 45 can do and provide a mapping in accordance with the actuator's abilities.

For example, a sensor 40 may detect a person making a face in a real world environment 270, however, the detected face may not be recognized in one or more simulated environments 280. Rather than having to hardcode the face into each one of the many possible environments, the mapping manager 200 may abstract the face to reduce the amount of information conveyed about the emotional state of the person making the face. Once a mapping is performed, the mapping manager 200 may send the information resulting from the mapping to an actuator 45, which is capable of performing an appropriate action.

The actuator 45 is configured to perform an action in a real world environment 270 and/or a simulated environment 280. More specifically, the actuator 45 receives information from the mapping manager 200 and/or one or more managers 210, 220, 230, and 240. In embodiments, the actuator 45 may send one or more pieces of the received information to a script manager 250, which is configured to apply one or more scripts based on the received information.

The script manager 250 includes one or more scripts that may be used to determine what action and/or sequence of actions should be performed by the actuator 45 to obtain a desired outcome. The scripts may be predefined and/or created by one or more users, administrators, etc. For example, a user may define one or more scripts that cause an actuator to perform stimulator actions, such as spoken words, simulated gestures, etc., when a certain event is sensed by the sensors 40. In embodiments, scripts may be specific to an actuator 45 and/or used in a plurality of actuators. Scripts may also be used in a plurality of environments 270 and 280.

The actuator 45 may receive a translated action and/or sequence of actions from the script manager 250, which details which actions to perform. In embodiments, the actuator 45 may also include a monitoring engine to track the actions and provide feedback to the mapping manger 50. The feedback may show, e.g., a resultant action based on the stimulation.

By using the mapping manager 200 and applying one or more scripts, a sensor 40 can be bound to an actuator 45 throughout one or more real world environments and/or simulated environments. Moreover, by using the present invention, actions and/or events may be performed throughout any number of environments without requiring additional hardcoding. This beneficially provides a dynamic approach to linking actions in a first environment to a second environment without limiting the functionality of the action and/or event.

An illustrative example of how the sensor 40, managers 210, 220, 230, 240, 250 and 50, and actuator 45 may interact is provided herein for a more comprehensive understanding of the invention. Specifically, suppose a person is swinging a stick in a simulated environment 280. Sensors 40 may be placed on the stick and/or in objects surrounding the stick. These sensors 40 may be used to determine the position of the stick in the simulated environment 280. The cardinality manager 210 may be used to determine how many objects are surrounding the stick. The constraints manager 220 may be used to determine what kind of forces are acting upon the stick and whether the forces can be mapped into a different environment such as a real world environment 270 and/or a simulated environment 280. The proximity manager 230 may determine what objects, such as tree leaves, a puddle of water, etc., may be around and/or affected by the stick as it is being swung. In embodiments, like objects, such as leaves may move in a similar manner after being hit by the stick. The synchronization manager 230 may determine the timing of when, e.g., the stick hits the tree leaves, whether the tree leaves move when they are hit, whether all leaves in the tree move at the same time or after a predefined time so as to produce a rippling effect, etc. This information may be sent to the mapping manager 200, where it is used to determine which actuator 45 should be used to perform an action.

In embodiments, information obtained from the managers 210, 220, 230, and 240 may be sent to a script manager 250, which includes applicable scripts for the actuator 45. These scripts may be user or enterprise defined and may be used to define what action the actuator 45 should perform, how the performance should occur, the timing of the performance, etc. Thus, the script manager 250 may be used to instruct the actuator 45 as to how to swing the stick in a second simulated environment 280 or in a real world environment 270 so as to produce the same or a similar result.

Exemplary Implementation of the System

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
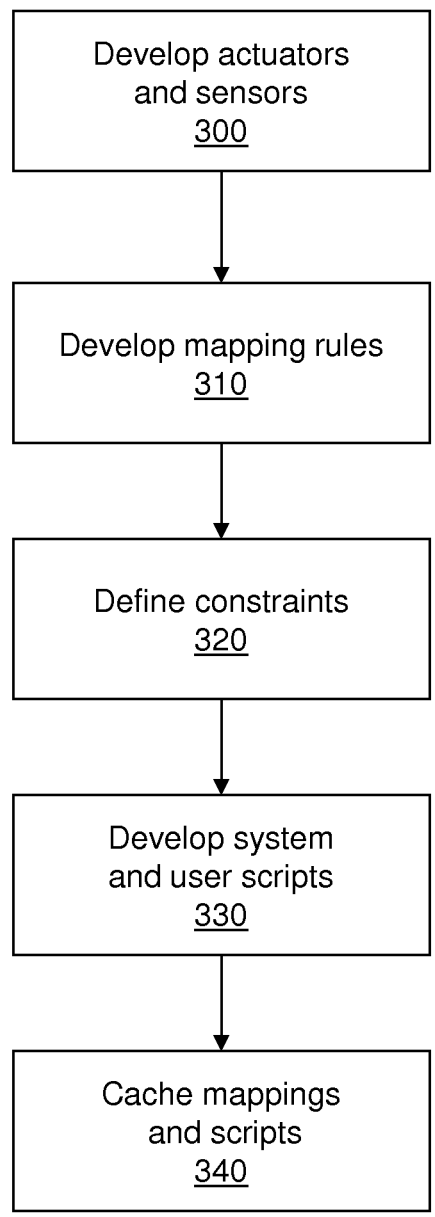
FIG. 3 shows an exemplary build time process in accordance with aspects of the invention.

FIG. 3 illustrates an exemplary build time process according to embodiments of the invention. At step 300, one or more sensors and/or actuators may be developed. For example, a motion sensor may be developed to detect movements in the real world and/or in a simulated environment. The sensor detected motions may be transferred to an actuator, which is configured to perform motions in the real world and/or in a simulated environment.

At step 310, one or more mapping rules may be developed. The mapping rules may be based off of lossy mappings, lossless mappings, and/or abstraction mappings. At step 320, constraints may be defined. The constraints may be logical and/or physical constraints that exist in the real world and/or a simulated environment. In embodiments, one or more scripts may also be developed, at step 330. The scripts may be predefined by, e.g., a system or a user, and may include a set of rules that define what action should be performed by the actuator. At step 340, one or more of the mappings and/or scripts may be cached for future use.

Figure 4:
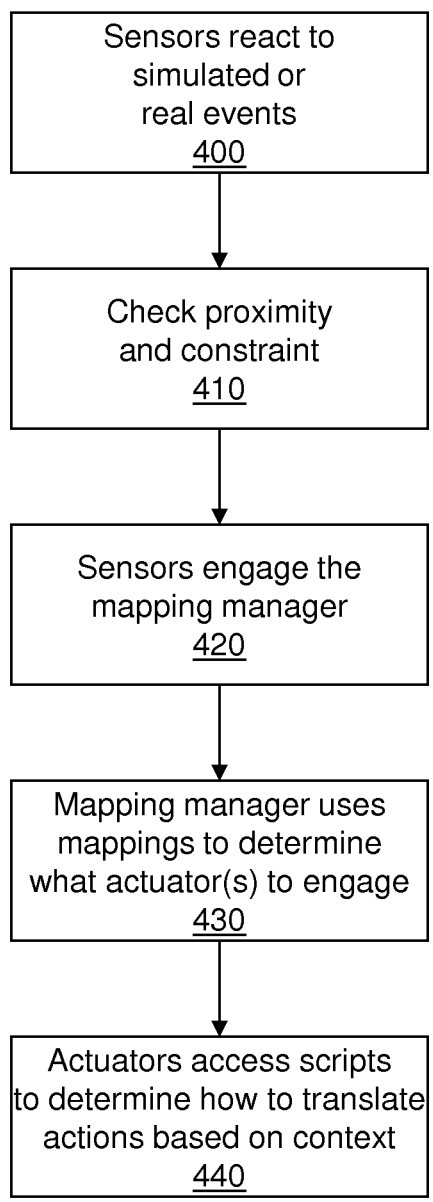
FIG. 4 shows an exemplary run time process in accordance with aspects of the invention.

FIG. 4 illustrates an exemplary run time process according to embodiments of the invention. More specifically, at step 400, one or more sensors are configured to react to simulated or real events actions within an environment. At step 410, information relating to a physical, type, and/or contextual proximity may be checked along with constraints that may be applicable given the sensed events or actions.

At step 420, information obtained from the sensors and/or information related to proximity or constraints may be used to engage the mapping engine. The mapping engine may use one or more mappings, such as lossy, lossless, or abstraction mappings to determine what actuator(s) should be engaged, at step 430. At step 440, the engaged actuator(s) may access one or more scripts to determine how to translate actions based on the context of the received information.

While the invention has been described in terms of embodiments, those skilled in the art will recognize that the invention can be practiced with modifications and in the spirit and scope of the appended claims. Additionally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A system for mapping interactions between environments, comprising:
at least one sensor configured to sense an event in a first environment;
a plurality of actuators configured to perform an action in any of a plurality of second environments; and
a mapping manager configured to:
use one or more mappings to determine one of the plurality of actuators to be engaged;
map the sensed event onto the engaged actuator to provide a custom interaction throughout the plurality of second environments;
determine that the engaged actuator of the plurality of actuators is unable to perform a first action corresponding to the sensed event; and
perform a mapping for the engaged actuator of the plurality of actuators, the mapping comprising reducing content of the sensed event into a second action which the engaged actuator is able to perform,
wherein the mapping manager is configured to obtain inputs from the at least one sensor, a cardinality manager, and a constraints manager, and
the mapping the sensed event onto the engaged actuator further comprises sending the inputs to a script manager which includes a corresponding script for the engaged actuator to instruct the engaged actuator to provide the custom interaction including a same result throughout the second environments as the event.

2. The system of claim 1, wherein the first environment and the plurality of second environments are one of a real world environment and a simulated environment.

3. The system of claim 1, wherein the mapping manager is configured to obtain the inputs from the at least one sensor and one or more of the cardinality manager, the constraints manager, a proximity manager, and a synchronization manager.

4. The system of claim 3, wherein the cardinality manager is configured to determine how many of the at least one sensor is in an area.

5. The system of claim 3, wherein the constraints manager is configured to track one or more conditions within the first environment and the plurality of second environments.

6. The system of claim 3, wherein the proximity manager is configured to determine a physicality, a type, and a context of an object.

7. The system of claim 3, wherein the synchronization manager is configured to determine one or more of a timing and an order for performing one or more actions.

8. The system of claim 1, wherein the mapping manager is configured to perform at least one of a lossy mapping, a lossless mapping, and an abstraction mapping.

9. The system of claim 1, wherein the script manager is further configured to determine an action or a sequence of actions to be performed to provide the custom interaction.

10. The system of claim 1, wherein the system is implemented on a computing infrastructure.

11. The system of claim 1, wherein the constraints manager determines one or more constraints that exist based on real world or simulated environmental conditions.

12. The system of claim 11, wherein:
the event is an action in the first environment; and
the constraints manager identifies a type of environment in which the action is being performed and tracks one or more conditions within the first environment including gravity, physical limitations, time limitations, and gestures.

13. The system of claim 12, wherein the constraints manager uses the tracked conditions to determine whether the action performed in the first environment can be mapped onto the action in the second environments, which has different environmental constraints.

14. The system of claim 13, wherein the mapping manager maps the event onto the engaged actuator, and binds and maps stimulator actions to actuator results.

15. The system of claim 1, wherein the at least one sensor is further configured to sense a plurality of voice commands.

16. The system of claim 15, wherein the at least one sensor is further configured to sense a plurality of voice gestures.

17. The system of claim 16, wherein the corresponding script is defined by a user and includes an action the engaged actuator performs and a timing of the action the engaged actuator performs.

18. The system of claim 17, wherein the at least one sensor comprises a monitoring engine configured to measure a physical quantity of the event and convert the measured physical quantity into a signal which is input to the mapping manager, each of the actuators comprises a monitoring engine configured to track a plurality of actions performed by each of the actuators and provide feedback to the mapping manager, and the script manager comprises a plurality of corresponding scripts for the actuators.

* * * * *